(12) United States Patent
Jones

(10) Patent No.: US 8,480,159 B2
(45) Date of Patent: Jul. 9, 2013

(54) TELESCOPING SLIDE OUT SYSTEMS FOR RECREATIONAL VEHICLES

(75) Inventor: Thomas G. Jones, Riverside, CA (US)

(73) Assignee: Fleetwood RV, Inc., Decatur, IN (US)

( * ) Notice: Subject to any disclaimer, the term of this patent is extended or adjusted under 35 U.S.C. 154(b) by 98 days.

(21) Appl. No.: 13/182,176

(22) Filed: Jul. 13, 2011

(65) Prior Publication Data

US 2013/0015679 A1 Jan. 17, 2013

(51) Int. Cl.
*B60P 3/34* (2006.01)

(52) U.S. Cl.
USPC ............... 296/175; 296/26.13; 296/171

(58) Field of Classification Search
USPC ............... 296/175, 26.12, 26.13, 26.01
See application file for complete search history.

(56) References Cited

U.S. PATENT DOCUMENTS

| | | |
|---|---|---|
| 2,704,223 A | 3/1955 | Houdart |
| 2,757,418 A | 8/1956 | Bergstrom |
| 2,842,972 A | 7/1958 | Houdart |
| 3,323,778 A | 6/1967 | Baker |
| 3,797,880 A | 3/1974 | Pezzaglia |
| 5,237,782 A | 8/1993 | Cooper |
| 5,505,515 A | 4/1996 | Turner |
| 5,577,351 A | 11/1996 | Dewald, Jr. et al. |
| 5,758,918 A | 6/1998 | Schneider et al. |
| 5,791,715 A | 8/1998 | Nebel |
| 5,902,001 A | 5/1999 | Schneider |
| 6,067,756 A | 5/2000 | Frerichs et al. |
| 6,212,710 B1 | 4/2001 | Jones |
| 6,454,336 B1 | 9/2002 | Nye et al. |
| 6,619,713 B2 | 9/2003 | Eichhorn |
| 6,619,726 B2 | 9/2003 | Jones |
| 6,658,798 B1 | 12/2003 | Frerichs et al. |
| 6,871,897 B1 | 3/2005 | Snyder |
| 6,976,721 B2 | 12/2005 | Rasmussen |
| 7,052,064 B2 | 5/2006 | Rasmussen |
| 7,226,116 B2 | 6/2007 | Jones |
| 7,360,815 B2 | 4/2008 | Kunz et al. |
| 7,802,834 B2 | 9/2010 | Cadena et al. |
| 2005/0184546 A1 | 8/2005 | Kunz et al. |
| 2006/0113822 A1 | 6/2006 | Kunz |
| 2006/0125265 A1 | 6/2006 | Kunz |
| 2006/0125266 A1 | 6/2006 | Kunz |
| 2006/0125268 A1 | 6/2006 | Kunz |
| 2008/0265618 A1 | 10/2008 | Cadena et al. |

*Primary Examiner* — Glenn Dayoan
*Assistant Examiner* — Melissa A Black
(74) *Attorney, Agent, or Firm* — Hovey Williams LLP

(57) ABSTRACT

Apparatus and operation methods for telescoping slide out systems for a recreational vehicle ("RV"). Telescoping slide out systems can comprise an outer box shiftable relative to the body of an RV and an inner box shiftable relative to the outer box. In certain embodiments, when the telescoping slide out system is in a retracted position, no interface between the outer box and the inner box is visible from the exterior of the RV.

19 Claims, 12 Drawing Sheets

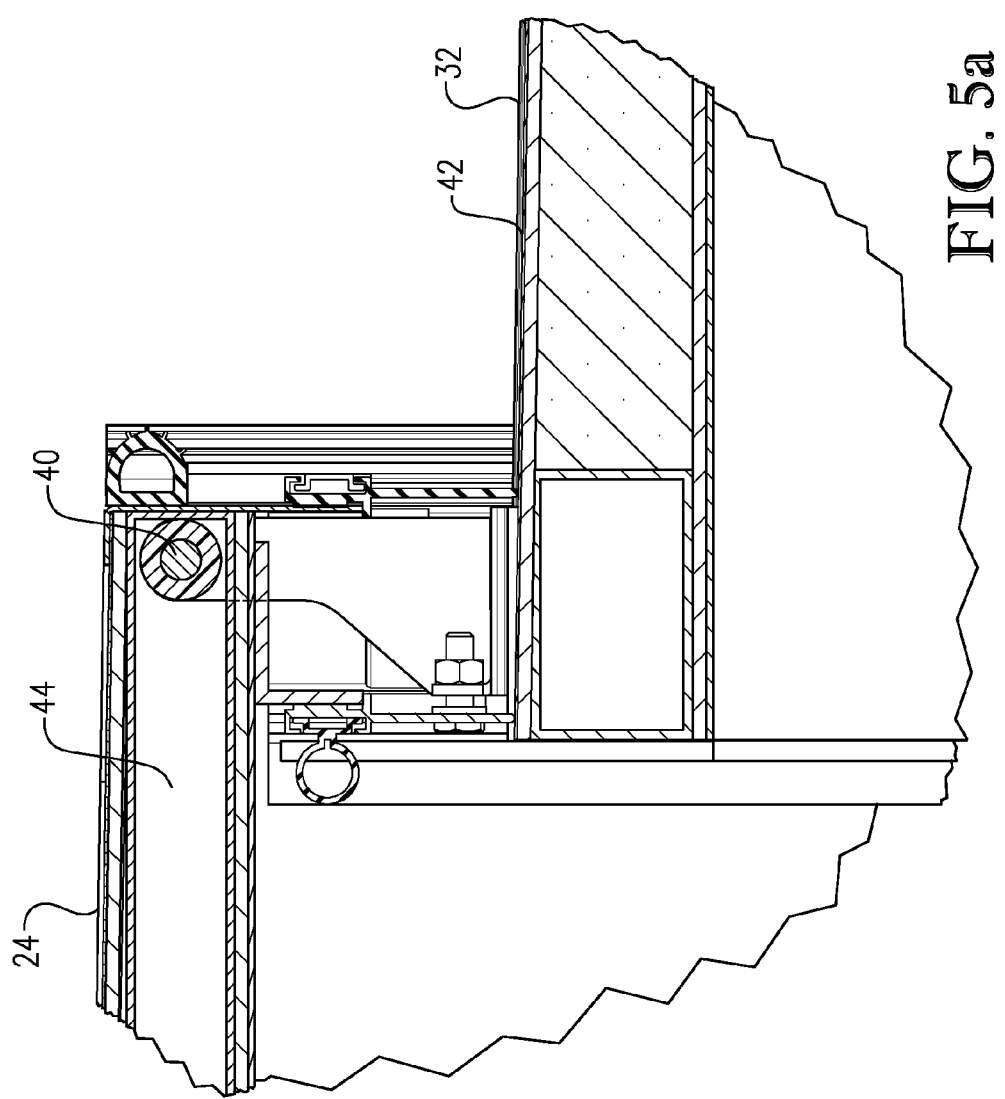

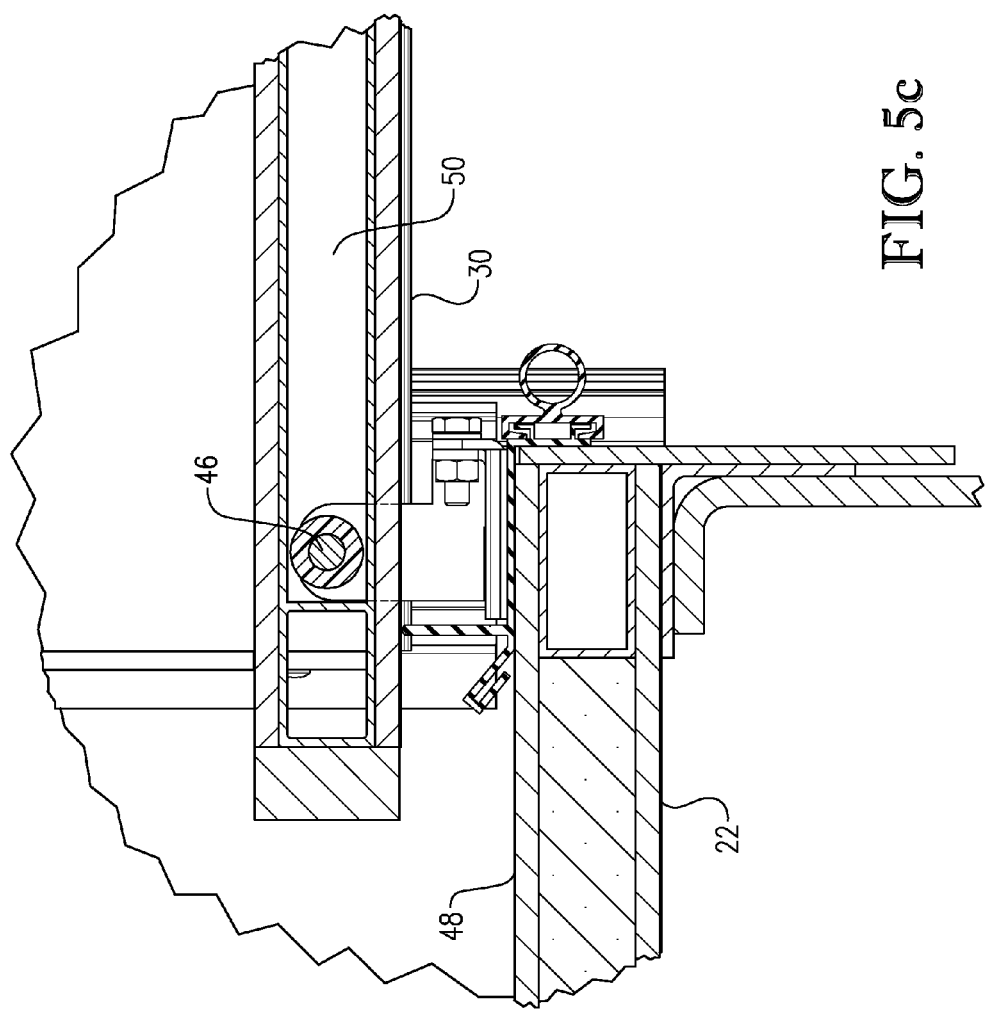

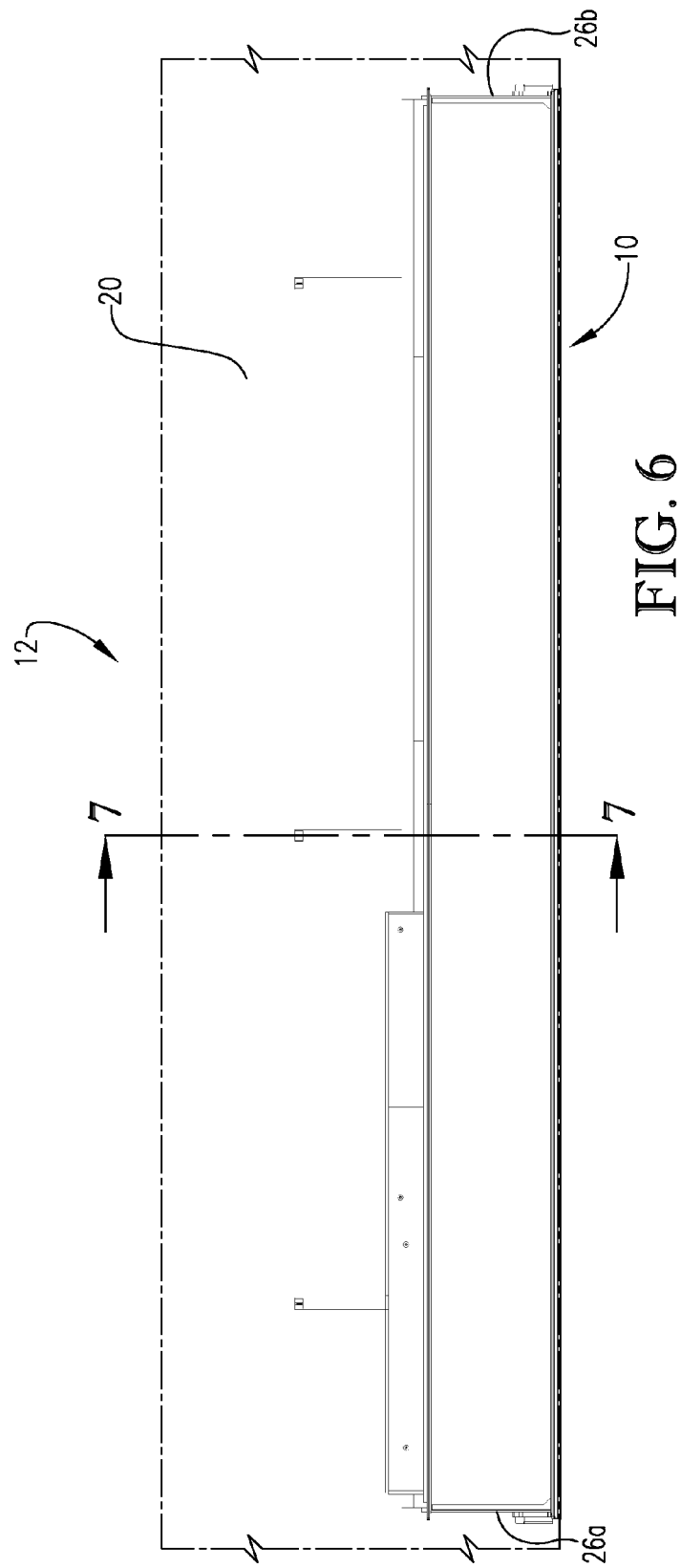

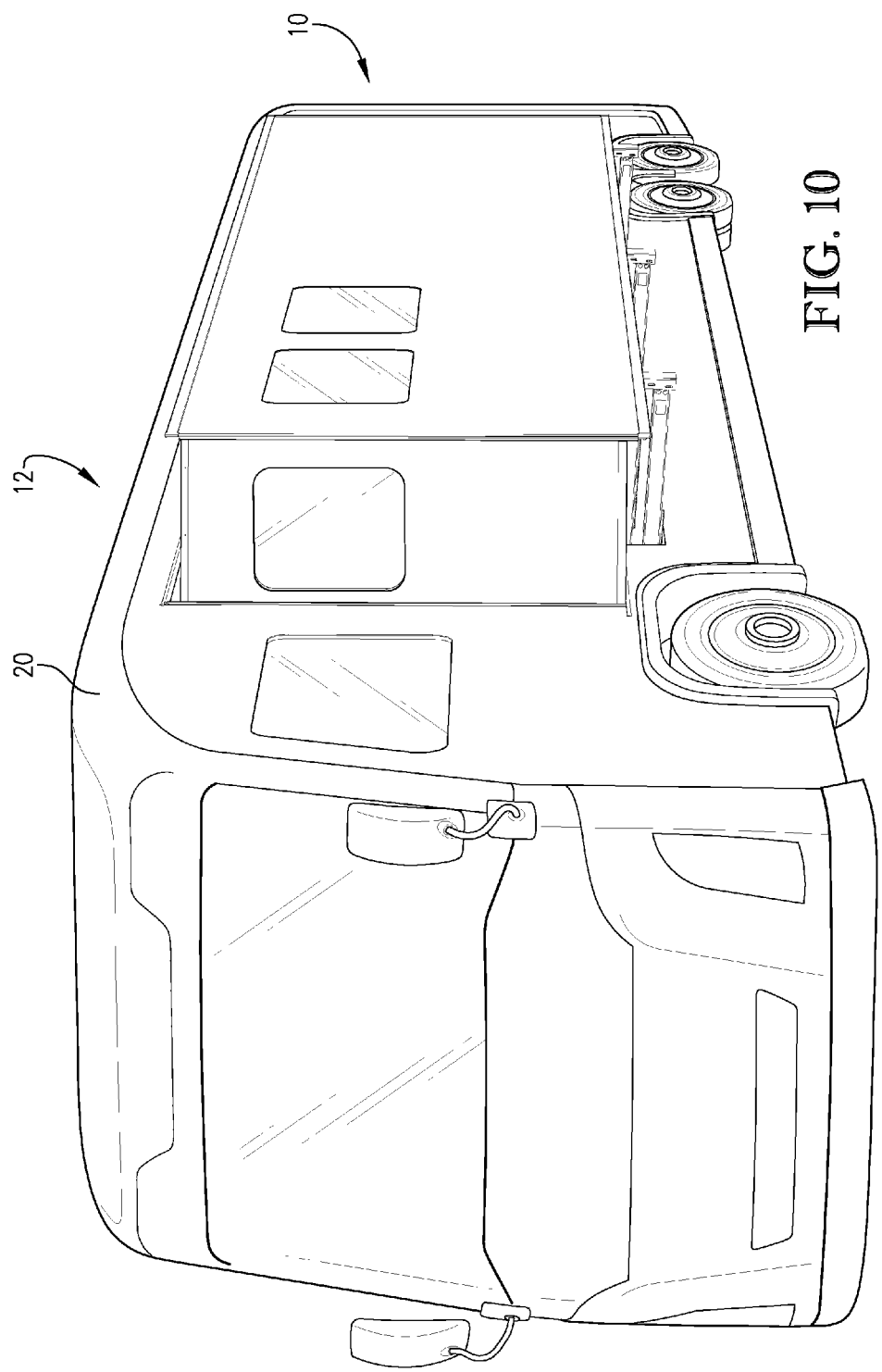

TELESCOPING SLIDE OUT SYSTEMS FOR RECREATIONAL VEHICLES

BACKGROUND

1. Field of the Invention

Various embodiments of the present invention concern slide out systems for a recreational vehicle ("RV"). More particularly, certain embodiments relate to multi-level or telescoping slide out systems for RVs.

2. Description of the Related Art

Recreational vehicles, such as motor homes, campers, travel trailers, fifth wheels, and the like, are increasingly popular travel options. Although freely mobile, as the size of RVs increase, the ease of handling tends to decrease. Additionally, RVs have dimensional limits dictated by, for example, highway regulations. Further, the capacity of the motor used to transport the RV may itself limit the size of the RV. Responding to the need for more living space inside smaller RVs, numerous different RVs incorporate pop-up tops or slide out rooms for selectively expanding the living area. Designed to be used only when the RV is parked, these rooms are retracted and stored in the interior of the RV during travel, and are slid outwardly when the RV is parked. Generally, upon parking the RV, the slide out rooms can be moved horizontally to an extended position to increase the usable interior space of the vehicle. Although advances have been made in the art of expandable RVs, improvements are still needed.

SUMMARY

One embodiment of the present invention concerns a recreational vehicle ("RV") comprising a vehicle body and a telescoping slide out system shiftable relative to the vehicle body between a retracted position and an extended position. In this embodiment, the telescoping slide out system comprises an outer box and an inner box, where the outer box is shiftable relative to the vehicle body, and the inner box is shiftable relative to the vehicle body and the outer box. Further, when the telescoping slide out system is in the retracted position, no interface between the outer box and the inner box is visible from the exterior of the RV.

Another embodiment of the present invention concerns a recreational vehicle ("RV") comprising a vehicle body and a telescoping slide out system shiftable relative to the vehicle body between a retracted position and an extended position. In this embodiment, the telescoping slide out system comprises an outer box, an inner box, and a ceiling support system, where the inner box comprises two opposing inner box end walls and an inner box ceiling extending between the tops of the inner box end walls. Further, the ceiling support system couples the inner box ceiling to the outer box at one or more locations spaced inwardly from the inner box end walls.

Yet another embodiment of the present invention concerns a recreational vehicle ("RV") comprising a vehicle body and a telescoping slide out system comprising an outer box and an inner box, where the outer box is shiftably coupled to the vehicle body and the inner box is shiftably coupled to the outer box. In this embodiment, the maximum length of the outer box is at least 70 percent of the maximum length of the RV, and the maximum length of the inner box is at least 80 percent of the maximum length of the outer box.

Still another embodiment of the present invention concerns a method of operating a telescoping slide out system of a recreational vehicle ("RV"). The method of this embodiment comprises shifting the telescoping slide out system from a retracted position to an extended position, where the telescoping slide out system comprises an outer box, an inner box, and a ceiling support system. Further, the inner box comprises two opposing inner box end walls and an inner box ceiling extending between the tops of the inner box end walls, and the ceiling support system couples the inner box ceiling to the outer box thereby at least partially supporting the inner box ceiling and/or outer box ceiling during shifting.

Yet still another embodiment of the present invention concerns a method of operating a telescoping slide out system of a recreational vehicle ("RV"). The method of this embodiment comprises shifting the telescoping slide out system out of a main body of the RV from a retracted position to an intermediate position, and shifting the telescoping slide out system from the intermediate position to an extended position. Furthermore, the telescoping slide out system comprises an outer box and an inner box. When the telescoping slide out system is in the intermediate position, the outer box is at least partially extended relative to the main body and the inner box is fully retracted relative to the outer box. Additionally, when the telescoping slide out system is in the extended position, the outer box is fully extended relative to the main body and the inner box is fully extended relative to the outer box.

BRIEF DESCRIPTION OF THE FIGURES

Embodiments of the present invention are described herein with reference to the following drawing figures, wherein:

FIG. 5*a* is an expanded cross-sectional view of the telescoping slide out system illustrated in FIG. 4, particularly illustrating a ceiling support system located near the upper interface of the outer box and the inner box of the telescoping slide out system;

FIG. 5*c* is an expanded cross-sectional view of the telescoping slide out system illustrated in FIG. 4, particularly illustrating a lower support system located near the lower interface of the outer box and the inner box of the telescoping slide out system;

FIG. 6 is a top view of a telescoping slide out system in a retracted position constructed according to the principles of the present invention;

FIG. 10 is an isometric view of the RV illustrated in FIG. 1 having the telescoping slide out system in an intermediate position, particularly illustrating an exterior wall and its size relative to the outer box of the telescoping slide out system.

DETAILED DESCRIPTION

Figure 1:
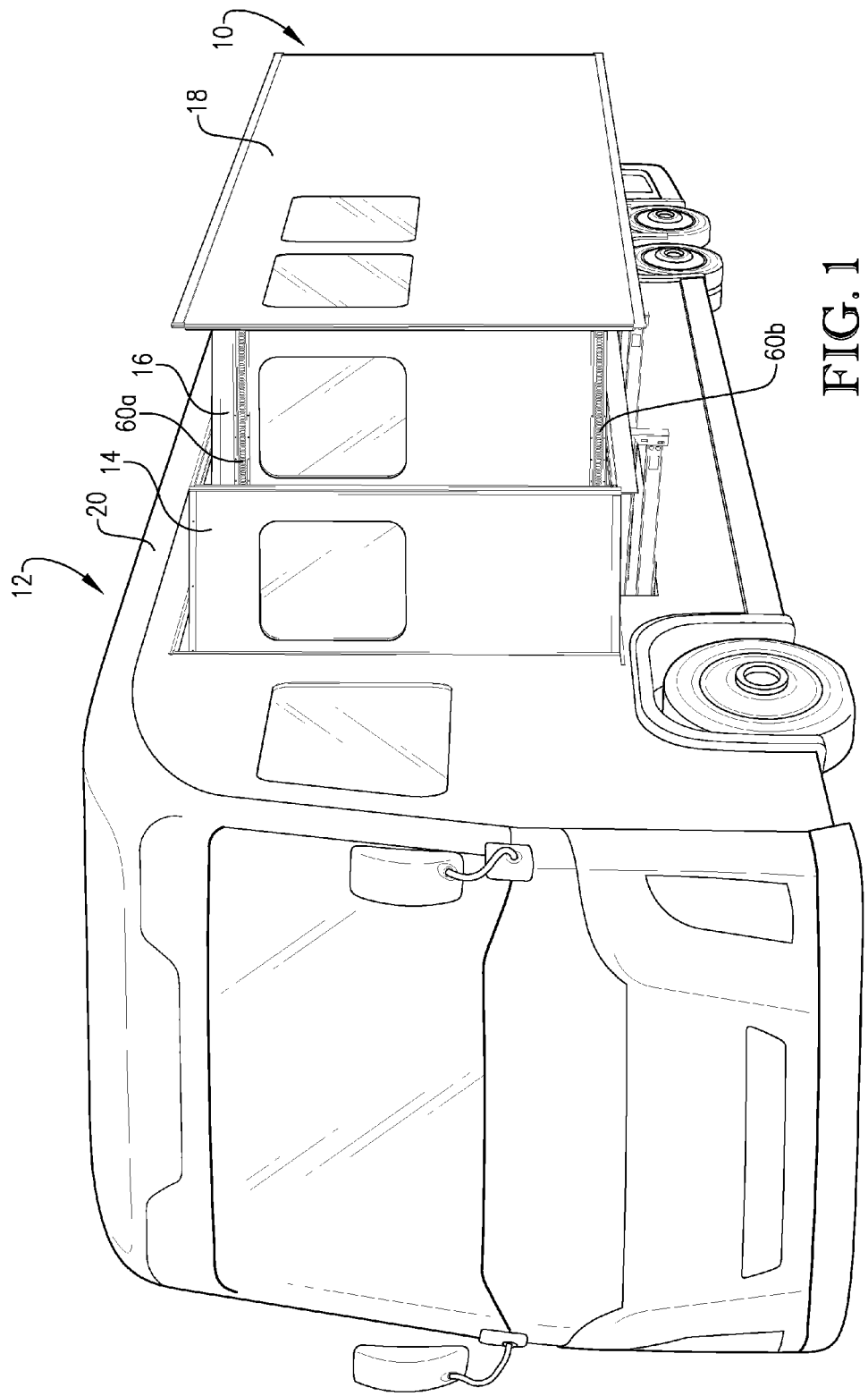
FIG. 1 is a front isometric view of a recreational vehicle ("RV") constructed in accordance with the principles of the present invention, particularly illustrating the RV's vehicle body and a telescoping slide out system in an extended position.

Referring initially to FIG. 1, a telescoping slide out system 10 of a recreational vehicle ("RV") 12 is illustrated as generally comprising an outer box 14, an inner box 16, and an exterior wall 18. The RV 12 additionally comprises a vehicle body 20. In various embodiments of the present invention, the telescoping slide out system 10 is shiftable relative to the vehicle body 20 between a retracted position and an extended position. As can be seen in FIG. 1, the outer box 14 can be shiftable relative of the vehicle body 20, while the inner box 16 can be shiftable relative to the outer box 14.

Figure 2:
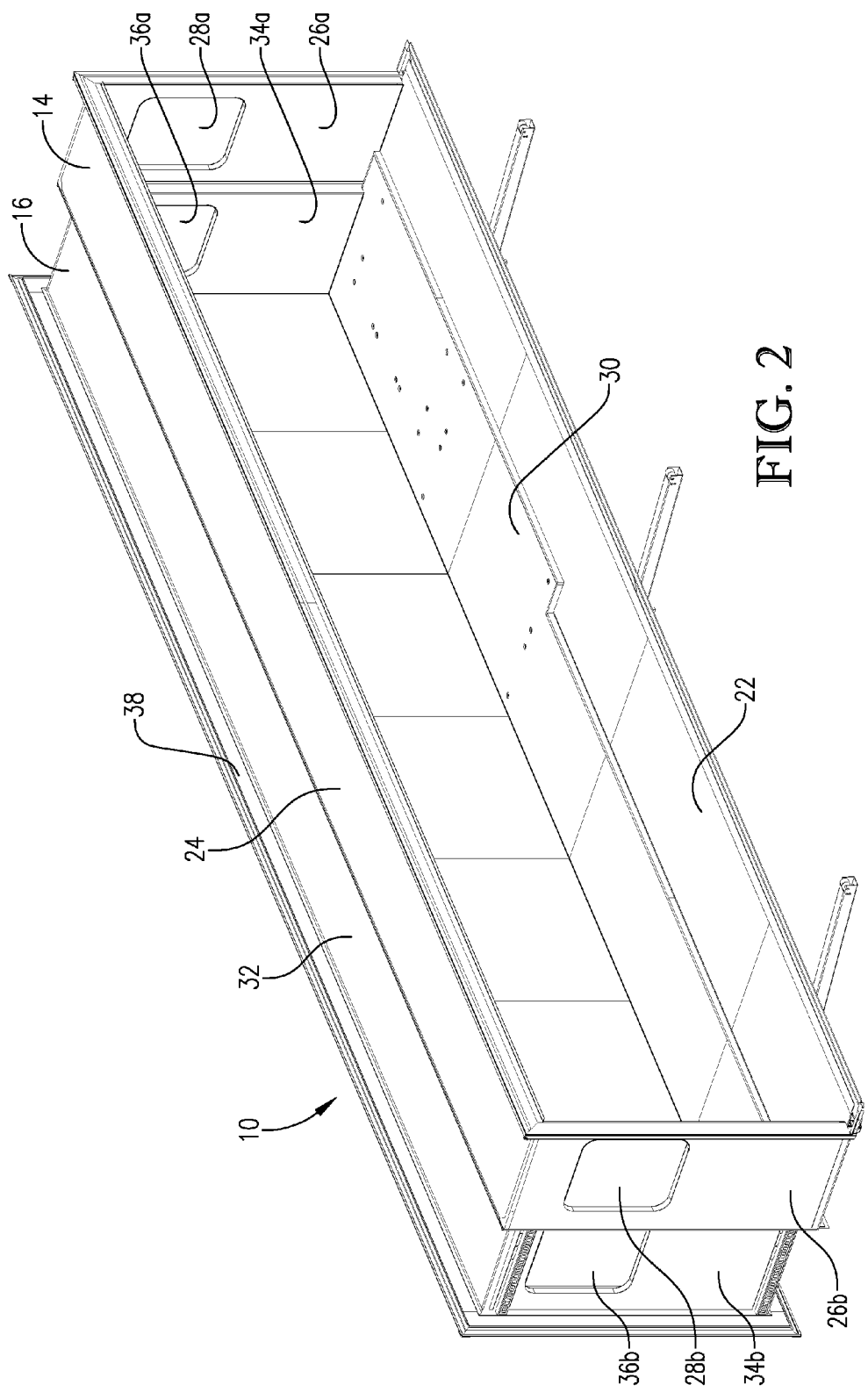
FIG. 2 is a partial isometric view of the telescoping slide out system illustrated in FIG. 1, presenting an internal view of the telescoping slide out system having an outer box and an inner box.

Referring now to FIG. 2, the telescoping slide out system 10 is depicted as detached from an RV, which illustrates the interior of the telescoping slide out system 10. As seen in FIG. 2, the outer box 14 of the telescoping slide out system 10 comprises an outer box floor 22, an outer box ceiling 24, and a pair of opposing outer box end walls 26a,b. Additionally, each of the opposing outer box end walls 26a,b comprises an outer box end wall window 28a,b. Similarly, the inner box 16 of the telescoping slide out system 10 comprises an inner box floor 30, an inner box ceiling 32, and a pair of opposing inner box end walls 34a,b. Additionally, each of the opposing inner box end walls 34a,b comprises an inner box end wall window 36a,b.

As seen in FIGS. 1 and 2, as noted above the inner box 16 further comprises an exterior wall 18. In one or more embodiments, the exterior wall 18 of the inner box 16 can comprise an occlusion lip 38 that extends beyond the perimeter created by the inner box ceiling 32, the inner box floor 30, and the inner box end walls 34a,b. In certain embodiments, the exterior wall 18 (including the occlusion lip 38) can have a surface area that is greater than the surface area that is defined by the interface between the outer box 14 and the inner box 16. Furthermore, the exterior wall 18 can have a surface area that is greater than the perimeter created by the outer box ceiling 24, the outer box floor 22, and the outer box end walls 26a,b. Additionally, in various embodiments, the occlusion lip 38 can conceal the interface between the outer box 14 and the inner box 16 when the telescoping slide out system 10 is in its fully retracted position relative to the vehicle body 20, as described in greater detail below. Furthermore, as discussed below, the telescoping slide out system can be positioned in an intermediate position where the inner box 16 is completely retracted relative to the outer box 14, and the outer box 14 is at least partially extended relative to the vehicle body 20. In this intermediate position, the exterior wall 18 can conceal the interface between the inner box 16 and the outer box 14, particularly when viewed from an angle orthogonal to the plane of the exterior wall 18.

Figure 3:
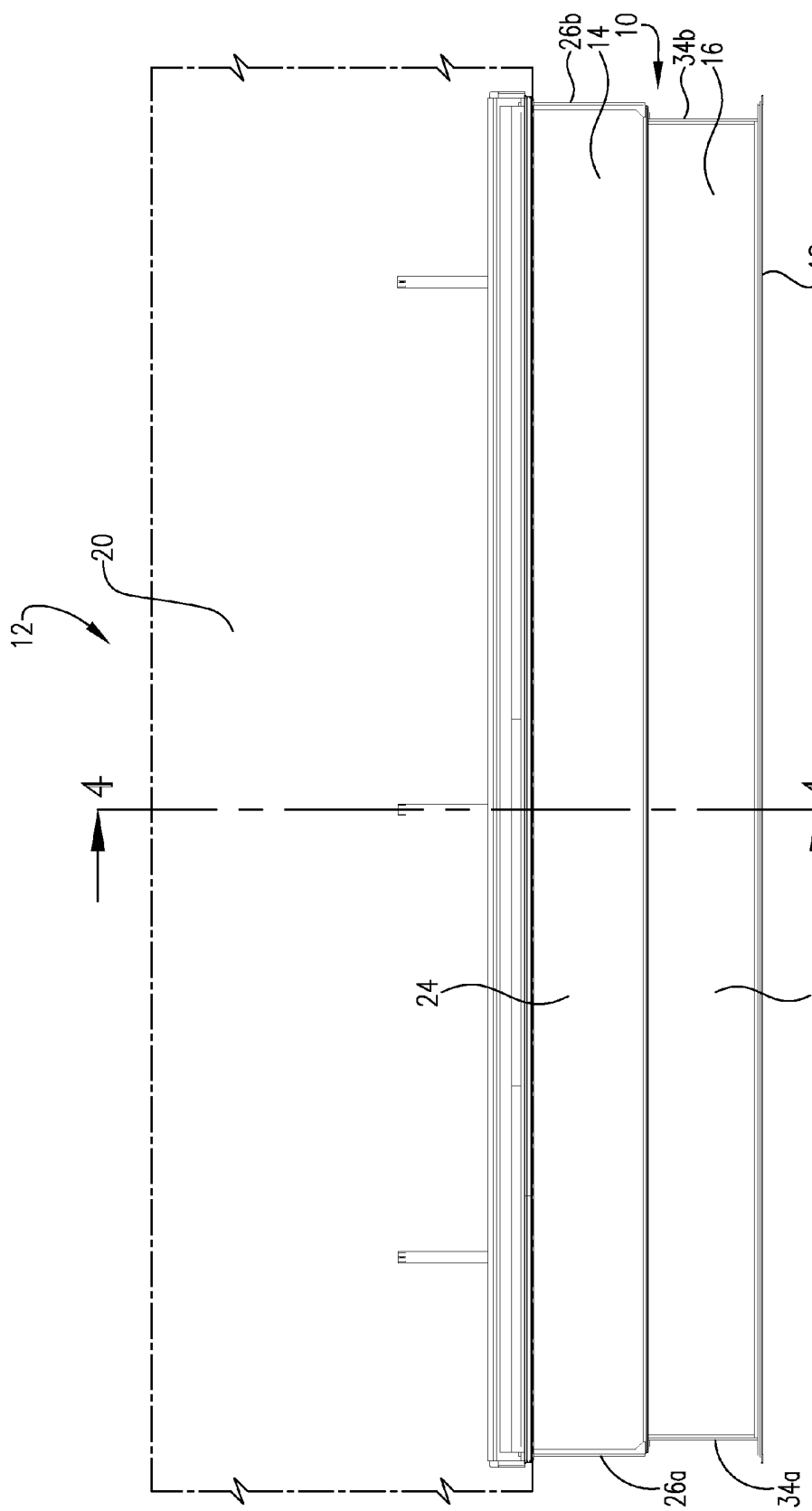
FIG. 3 is a top view of a telescoping slide out system in an extended position constructed according to the principles of the present invention.
Figure 4:
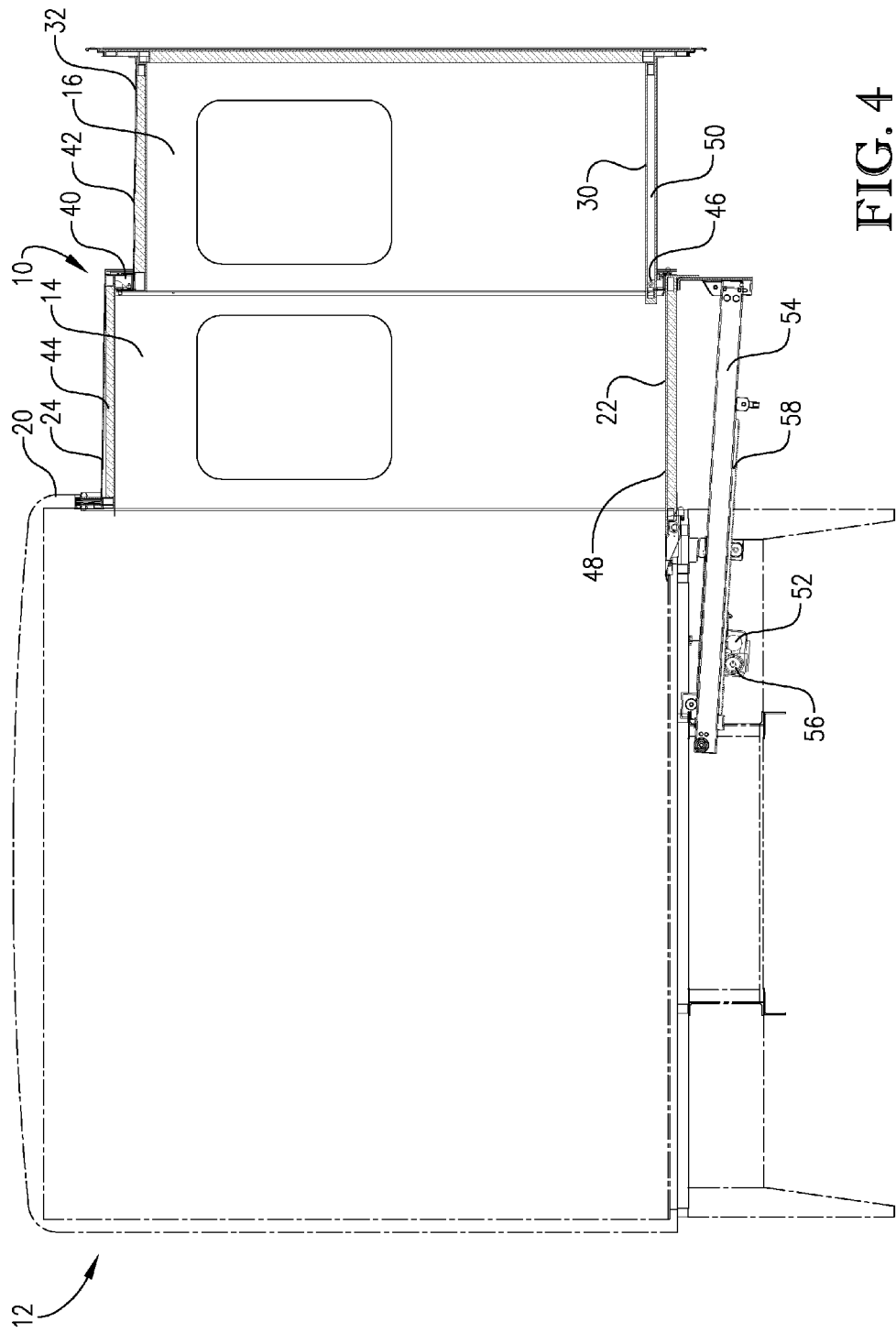
FIG. 4 is a cross-sectional view of the telescoping slide out system illustrated in FIG. 3 taken along line 4-4.

Referring now to FIGS. 3 and 4, the RV 12 is depicted showing the telescoping slide out system 10 in a fully extended position. In the fully extended position, the outer box 14 is fully extended relative to the vehicle body 20 and the inner box 16 is fully extended relative to the outer box 14.

In various embodiments, the length of the outer box 14 can be substantial in relation to the length of the vehicle body 20. In various embodiments, the outer box 14 can have a maximum length that is at least 15 percent, at least 20 percent, at least 25 percent, at least 30 percent, at least 35 percent, at least 40 percent, at least 45 percent, at least 50 percent, at least 55 percent, at least 60 percent, at least 65 percent, at least 70 percent, at least 75 percent, at least 80 percent, at least 85 percent, or at least 90 percent of the maximum length of the vehicle body 20. The length of the outer box 14 shall be measured from the interior surfaces of the outer box end walls 26a,b. In various embodiments, the outer box 14 can have a maximum length of at least 7 feet, at least 10 feet, at least 15 feet, at least 20 feet, at least 25 feet, or at least 30 feet. In additional embodiments, the outer box 14 can have an average length that is at least 15 percent, at least 20 percent, at least 25 percent, at least 30 percent, at least 35 percent, at least 40 percent, at least 45 percent, at least 50 percent, at least 55 percent, at least 60 percent, at least 65 percent, at least 70 percent, at least 75 percent, at least 80 percent, at least 85 percent, or at least 90 percent of the maximum length of the vehicle body 20. As used herein, "average" values shall be determined by averaging at least three substantially evenly spaced measurements. Furthermore, the outer box 14 can have an average length of at least 7 feet, at least 10 feet, at least 15 feet, at least 20 feet, at least 25 feet, or at least 30 feet.

The length of the inner box 16 can also be substantial in relation to the outer box 14. In various embodiments, the inner box 16 can have a maximum length that is at least 15 percent, at least 20 percent, at least 25 percent, at least 30 percent, at least 35 percent, at least 40 percent, at least 45 percent, at least 50 percent, at least 55 percent, at least 60 percent, at least 65 percent, at least 70 percent, at least 75 percent, at least 80 percent, at least 85 percent, or at least 90 percent of the maximum length of the outer box 14. The length of the inner box 16 shall be measured from the interior surfaces of the inner box end walls 34a,b. In various embodiments, the inner box 16 can have a maximum length of at least 7 feet, at least 18 feet, at least 23 feet, or at least 28 feet. In additional embodiments, the inner box 16 can have an average length that is at least 15 percent, at least 20 percent, at least 25 percent, at least 30 percent, at least 35 percent, at least 40 percent, at least 45 percent, at least 50 percent, at least 55 percent, at least 60 percent, at least 65 percent, at least 70 percent, at least 75 percent, at least 80 percent, at least 85 percent, or at least 90 percent of the maximum length of the outer box 14. Furthermore, the inner box 16 can have an average length of at least 7 feet, at least 18 feet, at least 23 feet, or at least 28 feet.

In various embodiments, the inner box 16 can also have a substantial height in relation to the outer box 14. In various embodiments, the inner box 16 can have a maximum height that is at least 50 percent, at least 55 percent, at least 60 percent, at least 65 percent, at least 70 percent, at least 75 percent, at least 80 percent, at least 85 percent, at least 90 percent, at least 93 percent, at least 95 percent, at least 96 percent, at least 97 percent, or at least 98 percent of the maximum height of the outer box 14. The height of the inner box 16 shall be measured from the interior surfaces of the inner box ceiling 32 and the inner box floor, respectively. Similarly, the height of the outer box 14 shall be measured from the interior surfaces of the outer box ceiling 24 and the outer box floor 22, respectively. In various embodiments, the inner box 16 can have a maximum height of at least 5 feet, at least 6 feet, or at least 7 feet. In additional embodiments, the inner box 16 can have an average height that is at least 50 percent, at least 55 percent, at least 60 percent, at least 65 percent, at least 70 percent, at least 75 percent, at least 80 percent, at least 85 percent, at least 90 percent, at least 93 percent, at least 95 percent, at least 96 percent, at least 97 percent, or at least 98 percent of the maximum height of the outer box 14. Furthermore, the inner box 16 can have an average height of at least 5 feet, at least 6 feet, or at least 7 feet.

In certain embodiments, the inner box 16 can also have a substantial cross-sectional area in relation to the outer box 14. In various embodiments, the inner box 16 can have a maximum cross-sectional area that is at least 20 percent, at least 35 percent, at least 50 percent, at least 55 percent, at least 60 percent, at least 65 percent, at least 70 percent, at least 75 percent, at least 80 percent, at least 85 percent, at least 90 percent, at least 93 percent, at least 95 percent, at least 96 percent, at least 97 percent, or at least 98 percent of the maximum cross-sectional area of the outer box 14. The cross-sectional area of the inner box 16 shall be measured from the interior surfaces of the inner box ceiling 32, the inner box floor 30, and the inner box end walls 34*a,b*, respectively. Similarly, the cross-sectional area of the outer box 14 shall be measured from the interior surfaces of the outer box ceiling 24, the outer box floor 22, and the outer box end walls 26*a,b*, respectively. In various embodiments, the inner box 16 can have a maximum cross-sectional area of at least 35 square feet, 90 square feet, at least 140 square feet, or at least 190 square feet. In additional embodiments, the inner box 16 can have an average cross-sectional area that is at least 20 percent, at least 35 percent, at least 50 percent, at least 55 percent, at least 60 percent, at least 65 percent, at least 70 percent, at least 75 percent, at least 80 percent, at least 85 percent, at least 90 percent, at least 93 percent, at least 95 percent, at least 96 percent, at least 97 percent, or at least 98 percent of the maximum cross-sectional area of the outer box 14. Furthermore, the inner box 16 can have an average cross-sectional area of at least 35 square feet, at least 90 square feet, at least 140 square feet, or at least 190 square feet.

In various embodiments, the telescoping slide out system 10 can comprise a ceiling support system that supports the inner box ceiling 32. Similarly, such a ceiling support system can provide support for the outer box ceiling 24. Such a support system can operate by coupling the outer box 14 to the inner box ceiling 32 at one or more locations spaced inwardly from the inner box end walls 34*a,b*. In various embodiments, the ceiling support system couples the inner box ceiling 32 to the outer box 14 using at least 1, at least 2, or at least 3 locations spaced inwardly from the inner box end walls 34*a,b*. In various embodiments, the ceiling support system can couple the outer box ceiling 24 to the inner box ceiling 32 at one or more locations spaced inwardly from the inner box end walls 34*a,b*. In various embodiments, the ceiling support system can couple the inner box ceiling 32 to the outer box ceiling 24 using at least 1, at least 2, or at least 3 locations spaced inwardly from the inner box end walls 34*a,b*. Furthermore, in various embodiments, the ceiling support system can slidably couple the inner box ceiling 32 to the outer box ceiling 24. In such embodiments, the ceiling support system can permit extension and retraction of the inner box 16 relative to the outer box 14 while maintaining support for inner box ceiling 32 and/or outer box ceiling 24.

In one or more embodiments, the ceiling support system can comprise at least one roller and at least one track, where the roller is configured to roll on and/or in the track when transitioning the inner box 16 from a retracted position to an extended position and vice versa. The roller can be coupled to either the inner box ceiling 32 or the outer box 14, while the track can be coupled to the other of the inner box ceiling 32 or the outer box 14. In various embodiments, the track can be coupled to the lower surface of the outer box ceiling 24 while the roller can be coupled to the upper surface of the inner box ceiling 32.

Figure 5B:
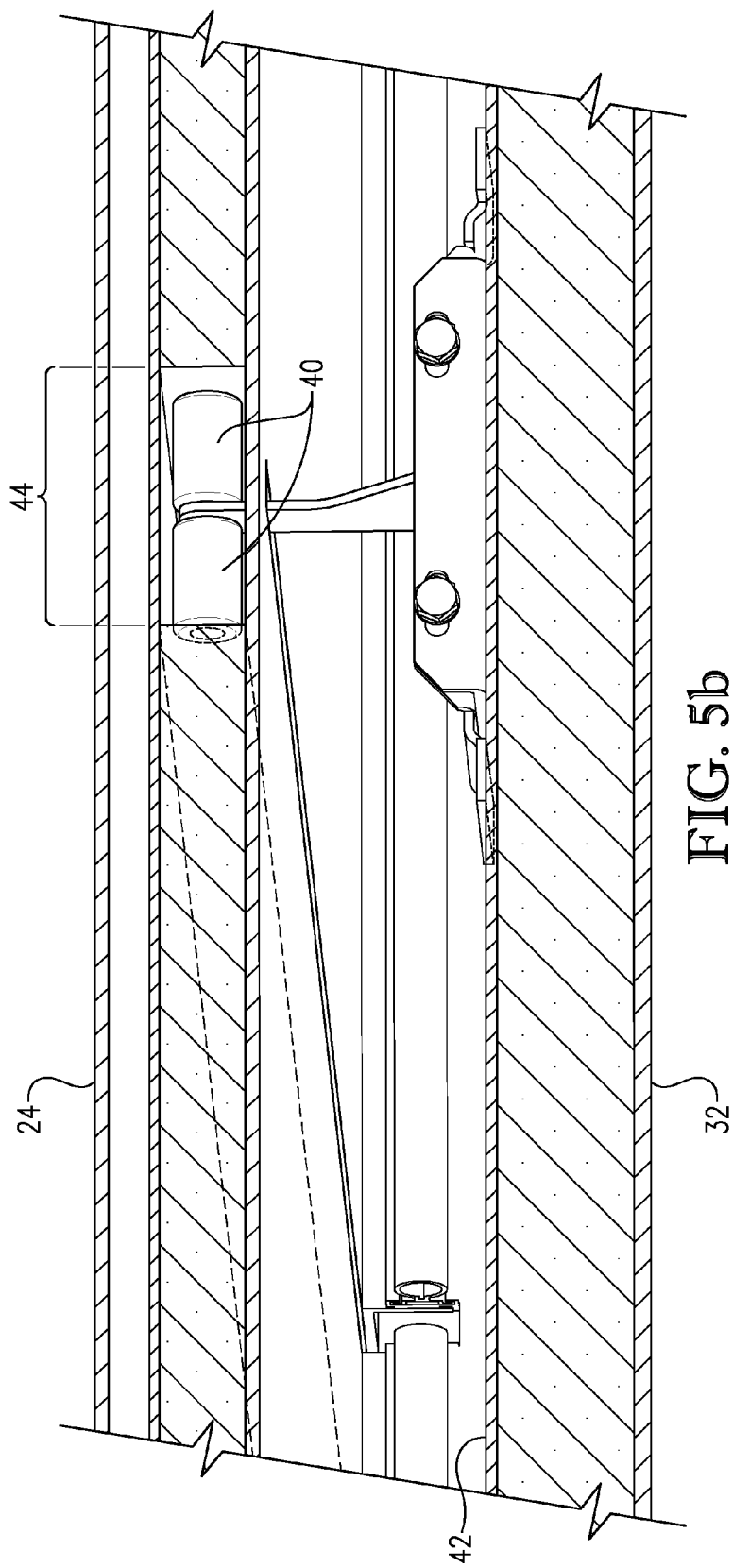
FIG. 5*b* is an expanded isometric cross-sectional view of the telescoping slide out system illustrated in FIG. 4, particularly illustrating the ceiling support system of the telescoping slide out system.

Referring now to FIGS. 4, 5*a*, and 5*b*, a cross-section of the telescoping slide out system 10 and the RV 12 is shown which details one embodiment of the above-described ceiling support system. In the embodiment shown in FIG. 4, an upper roller 40 extends upwardly from the upper surface 42 of the inner box ceiling 32. As is perhaps most easily seen in FIGS. 5*a* and 5*b*, the upper roller 40 is inserted into an upper track 44 that is coupled to the outer box ceiling 24. During operation, the upper roller 40 is operable to roll along the upper track 44 when transitioning the telescoping slide out system 10 from a retracted position to an extended position and vice versa. Accordingly, this ceiling support system provides support for the inner box ceiling 32 and/or the outer box ceiling 24 when the telescoping slide out system 10 is in the retracted position, in the extended position, and during any transition between the two. Although not depicted, the telescoping slide out system 10 can comprise a plurality of such upper roller and upper track couplings spaced inwardly from the inner box end walls 34*a,b*. In various embodiments, the telescoping slide out system 10 can comprise at least 1, at least 2, or at least 3 of such upper roller and upper track couplings. Although this upper roller and upper track system has been described as having the upper track 44 coupled to the outer box ceiling 24 and the upper roller 40 coupled to the inner box ceiling 32, it should be understood that the alternate configuration is contemplated by various embodiments of the present invention. In other words, in one or more embodiments, an upper roller can be coupled to the outer box ceiling 24 while a corresponding upper track can be coupled to the inner box ceiling 32.

In one or more embodiments, the telescoping slide out system 10 can further comprise a floor support system that at least partially supports the inner box floor 30. Such a support system can operate by coupling the outer box 14 to the inner box floor 30 at one or more locations spaced inwardly from the inner box end walls 34*a,b*. In various embodiments, the floor support system can couple the inner box floor 30 to the outer box 14 using at least 1, at least 2, at least 3, at least 4, at least 5, or at least 6 locations spaced inwardly from the inner box end walls 34*a,b*. In various embodiments, the floor support system can couple the outer box floor 22 to the inner box floor 30 at one or more locations spaced inwardly from the inner box end walls 34*a,b*. In various embodiments, the floor support system can couple the inner box floor 30 to the outer box floor 22 using at least 1, at least 2, at least 3, at least 4, at least 5, or at least 6 locations spaced inwardly from the inner box end walls 34*a,b*. Furthermore, in various embodiments, the floor support system can slidably couple the inner box floor 30 to the outer box floor 22. In such embodiments, the floor support system can permit extension and retraction of the inner box 16 relative to the outer box 14 while maintaining support for inner box floor 30.

In one or more embodiments, the floor support system can comprise at least one roller and at least one track, where the roller is configured to roll on and/or in the track when transitioning the inner box 16 from a retracted position to an extended position and vice versa. The roller can be coupled to either the inner box floor 30 or the outer box 14, while the track can be coupled to the other of the inner box floor 30 or the outer box 14. In various embodiments, the track can be coupled to the lower surface of the inner box floor 30 while the roller can be coupled to the upper surface of the outer box floor 22.

Referring now to FIGS. 4 and 5*c*, a cross-section of the telescoping slide out system 10 and the RV 12 is shown which details one embodiment of the above-described floor support system. In the embodiment shown in FIG. 4, a lower roller 46 extends upwardly from the upper surface 48 of the outer box floor 22. As is perhaps most easily seen in FIG. 5c, the lower roller 46 is inserted into a lower track 50 that is coupled to the inner box floor 30. During operation, the lower roller 46 is operable to roll along the lower track 50 when transitioning the telescoping slide out system 10 from a retracted position to an extended position and vice versa. Accordingly, this floor support system provides support for the inner box floor 30 when the telescoping slide out system 10 is in the retracted position, in the extended position, and during any transition between the two. Although not depicted, the telescoping slide out system 10 can comprise a plurality of such lower roller and lower track couplings spaced inwardly from the inner box end walls 34a,b. In various embodiments, the telescoping slide out system 10 can comprise at least 1, at least 2, at least 3, at least 4, at least 5, or at least 6 of such lower roller and lower track couplings. Although this lower roller and lower track system has been described as having the lower track 50 coupled to the inner box floor 30 and the lower roller 46 coupled to the outer box floor 22, it should be understood that the alternate configuration is contemplated by various embodiments of the present invention. In other words, in one or more embodiments, a lower roller can be coupled to the inner box floor 30 while a corresponding lower track can be coupled to the outer box floor 22. It should be noted that such a lower roller and lower track system is not critical to the embodiments described herein. Any conventional floor rollers can be employed in the embodiments of the present invention.

Referring again to FIGS. 1 and 2, defined in the outer box end walls 26a,b are respective outer box end wall windows 28a,b. In various embodiments, each of the outer box end wall windows 28a,b can be recessed with respect to the interior surface of the outer box end walls 28a,b. Additionally, each of the outer box end wall windows 28a,b can comprise a window treatment (not depicted). Examples of suitable window treatments include, but are not limited to, blinds, mini-blinds, accordion shades, roller shades, and the like. In various embodiments, the window treatment can be positioned in the respective recesses of the outer box end wall windows 28a,b so that such window treatments do not impede operation of the telescoping slide out system 10 when transitioning between retracted and extended positions.

Figure 7:
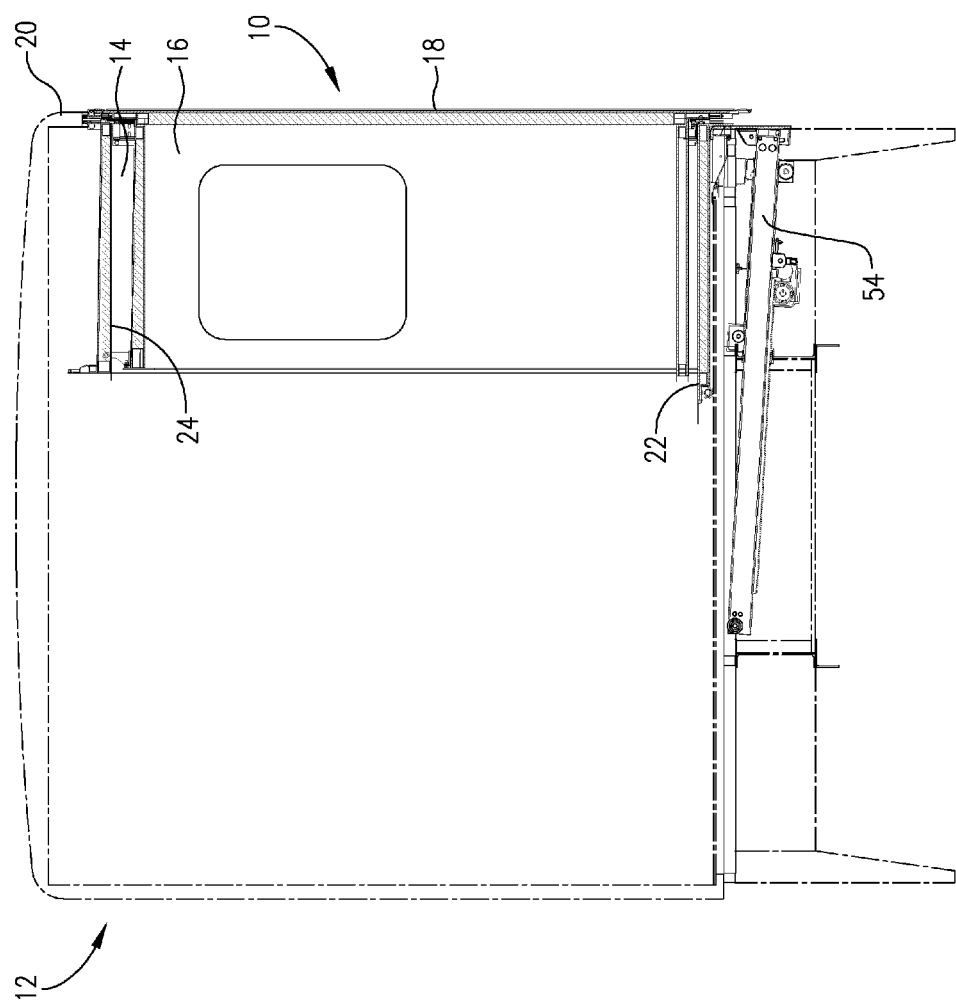
FIG. 7 is a cross-sectional view of the telescoping slide out system illustrated in FIG. 6 taken along line 7-7.

Referring now to FIGS. 6 and 7, the RV 12 is depicted having the telescoping slide out system 10 in its fully retracted position. As perhaps best seen in FIG. 7, when the telescoping slide out system 10 is in its fully retracted position, the outer box 14 can be substantially completely housed within the vehicle body 20 of the RV 12. Similarly, when the telescoping slide out system 10 is in its fully retracted position, the inner box 16 can be substantially completely housed within the outer box 14, with the exception of the exterior wall 18. As noted above, the exterior wall 18 can have a surface area that is greater than the perimeter created by the outer box ceiling 24, the outer box floor 22, and the outer box end walls 26a,b. In such embodiments, when the telescoping slide out system 10 is in its fully retracted position, no interface between the outer box 14 and the inner box 16 is visible from the exterior of the RV 12.

Figure 8:
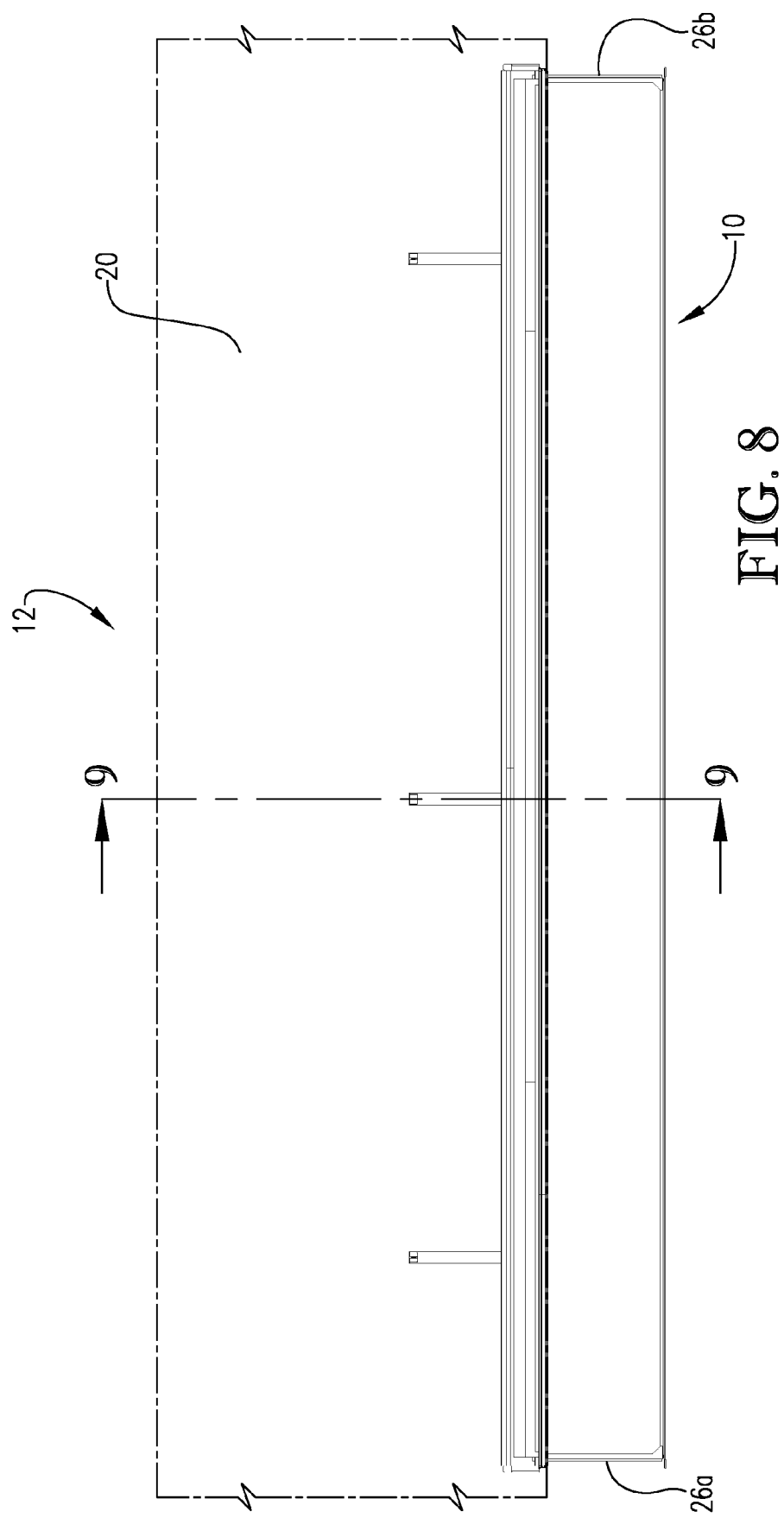
FIG. 8 is a top view of a telescoping slide out system in an intermediate position constructed according to the principles of the present invention.
Figure 9:
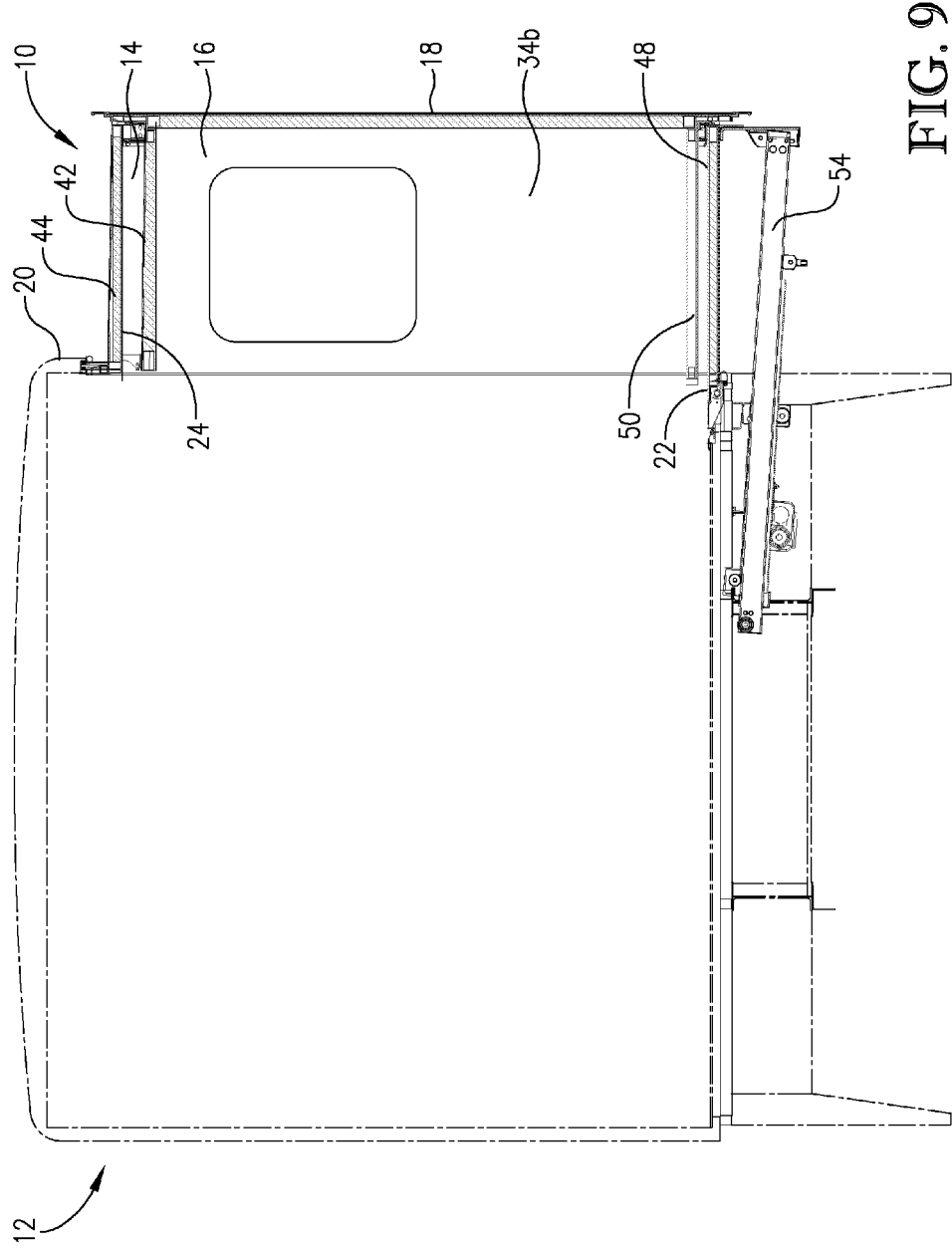
FIG. 9 is a cross-sectional view of the telescoping slide out system illustrated in FIG. 8 taken along line 9-9, particularly illustrating the telescoping slide out system in an intermediate position such that the outer box of the telescoping slide out system is fully extended while the inner box of the telescoping slide out system is fully retracted relative to the outer box.

Referring now to FIGS. 8 through 10, the RV 12 is depicted having the telescoping slide out system 10 in an intermediate position. As can be seen in FIG. 9, when the telescoping slide out system 10 is in this particular intermediate position, the outer box 14 is substantially fully extended relative to the vehicle body 20 of the RV 12. In contrast, the inner box 16 is substantially completely housed within the outer box 14, with the exception of the exterior wall 18. As noted above, the exterior wall 18 can have a surface area that is greater than the perimeter created by the outer box ceiling 24, the outer box floor 22, and the outer box end walls 26a,b. In such embodiments, when the telescoping slide out system 10 is in an intermediate position having the inner box 16 being substantially completely retracted relative to the outer box 14, no interface between the outer box 14 and the inner box 16 is visible from the exterior of the RV when viewed at an angle orthogonal to the plane of the exterior wall 18. Furthermore, when the telescoping slide out system 10 is in an intermediate position having the inner box being substantially completely retracted relative to the outer box 14, neither of the inner box end walls 34a,b are visible from the exterior of the RV 12. It should be noted that, although only a single intermediate position is depicted in FIGS. 8-10, the telescoping slide out system 10 can be positioned in any number of intermediate positions ranging from, for example, the outer box 14 being partially extended with the inner box 16 being fully retracted to the outer box 14 being fully extended and the inner box 16 being partially extended. In other embodiments, intermediate positions for the telescoping slide out system 10 could range from the inner box 16 being partially extended with the outer box 14 being fully retracted to the inner box 16 being fully extended and the outer box 14 being partially extended.

As discussed above, the telescoping slide out system 10 can be placed in a variety of positions, including fully retracted, fully extended, and many intermediate positions therebetween. Accordingly, various embodiments of the present invention concern shifting the telescoping slide out system 10 into various positions, such as from a retracted position to an extended position. In one or more embodiments, such shifting can comprise first shifting the outer box 14 from a retracted position to a fully extended position relative to the vehicle body 20 of the RV 12. Thereafter, the inner box 16 can be shifted from a retracted position to a fully extended position relative to the outer box 14. It should be noted that, as described above, a ceiling support system can at least partially support the inner box ceiling 32 and/or the outer box ceiling 24 before, during, and after such shifting.

Any methods known or hereafter discovered in the art can be employed for shifting the telescoping slide out system 10 between retracted and extended positions. In various embodiments, one or more motors can be employed to shift the telescoping slide out system 10 between retracted and extended positions. For example, referring again to FIG. 4, a motor 52 is depicted that can operate to extend an extender arm 54, which is coupled to outer box 14. In such embodiments, the motor can work in conjunction with a rack and pinion system, whereby the motor turns a pinion gear 56 engaged with a rack gear 58 that is coupled to the extender arm 54. In various embodiments, the RV 12 can comprise a plurality of such extender arms. Additionally, such extender arms can be operated by a single motor and gear system or by a plurality of motor and gear systems coupled to respective extender arms. Furthermore, although an electric motor is depicted in FIG. 4, it should be noted that other types of motors are contemplated for use in the various embodiments described herein, such as, for example, pneumatic or hydraulic motors. It should be noted that the extender arm system just described is not critical to the embodiments described herein. For example, any conventional in-wall system for shifting the telescoping slide out system 10 between retracted and extended positions could also be employed.

The inner box 16 can also be shifted between retracted and extended positions employing one or more motors in conjunction with gear systems. For example, with reference to FIG. 1, one or more motors (not depicted) can be employed to turn respective pinion gears (not depicted) engaged with respective rack gears 60*a,b* coupled to the inner box 16. In one or more embodiments, the motors and pinions employed for extending the inner box 16 can be substantially housed in the outer box end walls 26*a,b*, respectively, while the rack gears 60*a,b* can be coupled to or defined in the inner box end walls 34*a,b*, respectively.

It should be noted that details regarding how the outer box 14 and the inner box 16 fit together in the vehicle body 20, including such items as gaskets and lips, have been omitted for simplicity, but are known within the art of RV design. It should further be noted that, although the telescoping slide out system 10 has been described above as extending transversely from the RV 12, a telescoping slide out system that extends from the rear of an RV is also contemplated by various embodiments of the present invention. The operational details of such a configuration would be apparent to one of ordinary skill in the art based on the teachings herein. Additionally, although all embodiments depicted herein relate to a motor home type RV, the telescoping slide out system described above can be employed in other types of RVs as well, such as, for example, campervans, truck campers, popup campers, travel trailers, hybrid trailers, fifth wheel trailers, toterhomes, and toy haulers.

DEFINITIONS

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "includes," and "include" have the same open-ended meaning as "comprising," "comprises," and "comprise" provided above.

CLAIMS NOT LIMITED TO DISCLOSED EMBODIMENTS

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A recreational vehicle ("RV") comprising:
a vehicle body; and
a telescoping slide out system shiftable relative to said vehicle body between a retracted position and an extended position,
wherein said telescoping slide out system comprises an outer box and an inner box,
wherein said outer box is shiftable relative to said vehicle body,
wherein said inner box is shiftable relative to said vehicle body and said outer box,
wherein when said telescoping slide out system is in said retracted position, no interface between said outer box and said inner box is visible from the exterior of said RV,
wherein said inner box comprises an exterior wall, wherein said exterior wall has a surface area that is greater than the surface area defined by the interface between said outer box and said inner box.

2. The recreational vehicle of claim 1, wherein the maximum length of said outer box is at least 15 percent of the maximum length of said vehicle body, wherein the maximum length of said inner box is at least 80 percent of the maximum length of said outer box, wherein said inner box has a maximum height that is at least 80 percent of the maximum height of said outer box.

3. The recreational vehicle of claim 1, wherein said inner box has a maximum cross-sectional area that is at least 20 percent of the maximum cross-sectional area of said outer box.

4. The recreational vehicle of claim 1, wherein said telescoping slide out system further comprises a ceiling support system, wherein said inner box comprises two opposing inner box end walls and an inner box ceiling extending between the tops of said inner box end walls, wherein said ceiling support system couples said inner box ceiling to said outer box at one or more locations spaced inwardly from said inner box end walls.

5. The recreational vehicle of claim 4, wherein said ceiling support system comprises at least one roller and at least one track, wherein said roller is configured to roll on and/or in said track during at least a portion of the shifting of said telescoping slide out between said retracted position and said extended position, wherein said roller is coupled to one of said inner box ceiling and said outer box, wherein said track is coupled to the other of said inner box ceiling and said outer box.

6. The recreational vehicle of claim 1, wherein said telescoping slide out system is shiftable in a direction that is transverse to the direction of elongation of said vehicle body.

7. The recreational vehicle of claim 1, wherein said telescoping slide out system is shiftable relative to said vehicle body to an intermediate position between said retracted position and said extended position, wherein when said telescoping slide out system is in said intermediate position, said outer box is at least partially extended relative to said vehicle body and said inner box is fully retracted relative to said outer box.

8. A recreational vehicle ("RV") comprising:
a vehicle body; and
a telescoping slide out system shiftable relative to said vehicle body between a retracted position and an extended position,
wherein said telescoping slide out system comprises an outer box, an inner box, and a ceiling support system,
wherein said inner box comprises two opposing inner box end walls and an inner box ceiling extending between the tops of said inner box end walls, wherein said ceiling support system couples said inner box ceiling to said outer box at one or more locations spaced inwardly from said inner box end walls.

9. The recreational vehicle of claim 8, wherein said ceiling support system couples said inner box ceiling to said outer box at a plurality of locations substantially evenly spaced inwardly from said inner box end walls.

10. The recreational vehicle of claim 8, wherein said ceiling support system comprises at least one roller and at least one track, wherein said roller is configured to roll on and/or in said track during at least a portion of the shifting of said telescoping slide out system between said retracted position and said extended position, wherein said roller is coupled to one of said inner box ceiling and said outer box, wherein said track is coupled to the other of said inner box ceiling and said outer box.

11. The recreational vehicle of claim 10, wherein said outer box comprises two opposing outer box end walls and an outer box ceiling extending between the tops of said outer box end walls, wherein said track is coupled to a lower surface of said outer box ceiling and extends transverse to the direction of elongation of said RV, wherein said roller is coupled to an upper surface of said inner box ceiling.

12. The recreational vehicle of claim 8, wherein when said telescoping slide out system is in said retracted position, no interface between said outer box and said inner box is visible from the exterior of said RV.

13. The recreational vehicle of claim 8, wherein the maximum length of said outer box is at least 70 percent of the maximum length of said vehicle body, wherein the maximum length of said inner box is at least 20 percent of the maximum length of said outer box, wherein said inner box has a maximum height that is at least 80 percent of the maximum height of said outer box, wherein said inner box has a maximum cross-sectional area that is at least 80 percent of the maximum cross-sectional area of said outer box.

14. A method of operating a telescoping slide out system of a recreational vehicle ("RV"), said method comprising:
shifting said telescoping slide out system from a retracted position to an extended position,
wherein said telescoping slide out system comprises an outer box, an inner box, and a ceiling support system,
wherein said inner box comprises two opposing inner box end walls and an inner box ceiling extending between the tops of said inner box end walls,
wherein said ceiling support system couples said inner box ceiling to said outer box thereby at least partially supporting said inner box ceiling and/or said outer box ceiling during said shifting.

15. The method of claim 14, wherein said ceiling support system at least partially supports said inner box ceiling and/or said outer box ceiling at said retracted position and said extended position.

16. The method of claim 14, wherein said ceiling support system couples said inner box ceiling to said outer box at one or more locations spaced inwardly from said inner box end walls.

17. The method of claim 14, wherein said ceiling support system comprises at least one roller and at least one track, wherein said roller is configured to roll on and/or in said track during at least a portion of the shifting of said telescoping slide out system between said retracted position and said extended position, wherein said roller is coupled to one of said inner box ceiling and said outer box, wherein said track is coupled to the other of said inner box ceiling and said outer box.

18. The method of claim 17, wherein said outer box comprises two opposing outer box end walls and an outer box ceiling extending between the tops of said outer box end walls, wherein said track is coupled to a lower surface of said outer box ceiling and extends transverse to the direction of elongation of said RV, wherein said roller is coupled to an upper surface of said inner box ceiling.

19. The method of claim 14, wherein said ceiling support system couples said inner box ceiling to said outer box at a plurality of locations substantially evenly spaced inwardly from said inner box end walls.

* * * * *